(12) United States Patent
Yu et al.

(10) Patent No.: US 7,182,903 B2
(45) Date of Patent: Feb. 27, 2007

(54) ENDLESS BELT MEMBER STRESS RELIEF

(75) Inventors: Robert C. U. Yu, Webster, NY (US); Satchidanand Mishra, Webster, NY (US); Anthony M. Horgan, Pittsford, NY (US); Richard L. Post, Penfield, NY (US); Edward F. Grabowski, Webster, NY (US); Tsu-sen Chow, Penfield, NY (US); John A. Bergfjord, Sr., Macedon, NY (US); Miguel A. Boscan, Macedon, NY (US); John J. Darcy, III, Webster, NY (US); Michael S. Roetker, Webster, NY (US); Scott J. Griffin, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 314 days.

(21) Appl. No.: 10/385,409

(22) Filed: Mar. 7, 2003

(65) Prior Publication Data

US 2004/0173943 A1    Sep. 9, 2004

(51) Int. Cl.
*B29C 61/00* (2006.01)
*B29C 53/00* (2006.01)
*B29C 35/00* (2006.01)
*B29C 31/00* (2006.01)
*B29C 70/00* (2006.01)

(52) U.S. Cl. ............... 264/493; 264/285; 264/346; 264/235

(58) Field of Classification Search ............... 264/340, 264/345, 346, 210.5, 235, 493, 285
See application file for complete search history.

(56) References Cited

U.S. PATENT DOCUMENTS

| 3,121,006 | A | | 2/1964 | Middleton et al. |
| 3,659,000 | A | * | 4/1972 | Cronk ..................... 156/229 |
| 3,944,644 | A | * | 3/1976 | Van Cappellen et al. ... 264/146 |

(Continued)

FOREIGN PATENT DOCUMENTS

DE    2833189    *   1/1980

OTHER PUBLICATIONS

Translation of DE2833189, Schreiber Translations, Inc., 2004.*

*Primary Examiner*—Christina Johnson
*Assistant Examiner*—Matthew J. Daniels
(74) *Attorney, Agent, or Firm*—David E. Henn; Joseph M. Young

(57) ABSTRACT

Multilayered web stock is directed toward a curved surface and at least one layer of the web stock is heated to a temperature above a glass transition temperature of the at least one layer of the web stock. The heating can occur just before or upon engaging the curved surface. The temperature of the at least one layer remains above the glass transition temperature while engaging the curved surface, allowing reshaping and/or realignment of the at least one layer relative to other layers of the web stock according to conformance to the curved surface. The web stock is cooled before it disengages from the curved surface. The heating can be done with a high power infrared lamp focused into a line across the web stock, and the cooling can be done with a cooled fluid jet. Additionally, a preheater can be employed, and a supplemental cooler can be used.

37 Claims, 6 Drawing Sheets

U.S. PATENT DOCUMENTS

| | | |
|---|---|---|
| 4,223,384 A | 9/1980 | Hounsfield et al. |
| 4,229,897 A | 10/1980 | Snowden |
| 4,265,990 A | 5/1981 | Stolka et al. |
| 4,286,033 A | 8/1981 | Neyhart et al. |
| 4,291,110 A | 9/1981 | Lee |
| 4,306,008 A | 12/1981 | Pai et al. |
| 4,338,387 A | 7/1982 | Hewitt |
| 4,439,507 A | 3/1984 | Pan et al. |
| 4,587,189 A | 5/1986 | Hor et al. |
| 4,983,481 A | 1/1991 | Yu |
| 5,089,369 A | 2/1992 | Yu |
| 5,167,987 A | 12/1992 | Yu |
| 5,390,450 A * | 2/1995 | Goenka ........................ 451/75 |
| 5,606,396 A | 2/1997 | Yu et al. |
| 6,068,722 A * | 5/2000 | Yu et al. ..................... 156/137 |
| 6,277,534 B1 * | 8/2001 | Foltz et al. .................... 430/56 |

\* cited by examiner

ENDLESS BELT MEMBER STRESS RELIEF

CROSS-REFERENCE TO RELATED APPLICATIONS

Cross-reference and incorporation by reference is made to U.S. application Ser. No. 09/973,351, filed Oct. 9, 2001, now U.S. Pat. No. 6,743,390, issued Jun. 1, 2004 by Robert C. U. Yu and John A. Bergfjord, Sr., entitled STRESS RELEASE METHOD.

FIELD OF THE INVENTION

The invention relates to treatment methods for web stock. In particular, the invention relates to stress relief treatment methods for laminate web stock.

BACKGROUND AND SUMMARY

Flexible electrostatographic imaging members are well known in the electrostatographic marking art. Typical flexible electrostatographic imaging members include, for example, (1) electrophotographic imaging members (photoreceptors) commonly utilized in electrophotographic (xerographic) processing systems and (2) electroreceptors, such as ionographic imaging members for electrographic imaging systems. The flexible electrostatographic imaging members can be in the form of seamless or seamed belts. Typical electrophotographic imaging member belts comprise a charge transport layer and a charge generating layer on one side of a supporting substrate layer and an anticurl back coating applied to the opposite side of the supporting substrate layer to induce flatness. Electrographic imaging member belts, however, typically have a more simple material structure, including a dielectric imaging layer on one side of a supporting substrate and an anticurl back coating on the opposite side of the substrate. While the scope of embodiments covers an improved preparation process for flexible electrostatographic imaging members producing a crack resistance enhanced outer top imaging layer, the following discussion will focus only on processing of flexible electrophotographic imaging members for simplicity.

Electrophotographic flexible imaging members typically comprise a photoconductive layer, which can include a single layer or composite layers. Since typical electrophotographic imaging members can exhibit undesirable upward imaging member curling, the anticurl back coating brings each imaging member to at least a desired flatness.

One type of composite photoconductive layer used in electrophotography, illustrated in U.S. Pat. No. 4,265,990, for example, the disclosure of which is hereby incorporated by reference, has at least two electrically operative layers. One layer comprises a photoconductive layer that can photogenerate holes and inject the holes into a contiguous charge transport layer. Generally, where the two electrically operative layers are supported on a conductive layer with the photoconductive layer sandwiched between the contiguous charge transport layer and the conductive layer, the outer surface of the charge transport layer is normally charged with a uniform charge of a negative polarity and the supporting electrode is utilized as an anode. The supporting electrode can still function as an anode when the charge transport layer is sandwiched between the supporting electrode and the photoconductive layer. The charge transport layer in this case must be able to support the injection of photogenerated electrons from the photoconductive layer and to transport the electrons through the charge transport layer. Photosensitive members having at least two electrically operative layers can provide excellent electrostatic latent images when charged with a uniform negative electrostatic charge, exposed to a light image and thereafter developed with finely divided electroscopic marking particles. The resulting toner image is usually transferred to a suitable receiving member, such as paper.

As more advanced, higher speed electrophotographic copiers, duplicators and printers were developed, degradation of image quality was encountered during extended cycling. Moreover, complex, highly sophisticated duplicating and printing systems operating at very high speeds have created stringent requirements including narrow operating limits on photoreceptors. For flexible electrophotographic imaging members having a belt configuration, the numerous layers found in modern photoconductive imaging members must be highly flexible, adhere well to adjacent layers, and exhibit predictable electrical characteristics within narrow operating limits to provide excellent toner images over many thousands of cycles. One type of multilayered photoreceptor belt that has been employed as a belt in negatively charging electrophotographic imaging systems comprises a substrate, a conductive layer, a blocking layer, an adhesive layer, a charge generating layer, a charge transport layer, and a conductive ground strip layer adjacent to one edge of the imaging layers. This photoreceptor belt can also comprise additional layers, such as an anticurl back coating to balance curl and provide the desired belt flatness.

In a machine service environment, a flexible multilayered photoreceptor belt, mounted on a belt supporting module that includes a number of support rollers, is generally exposed to repetitive electrophotographic image cycling, which subjects the outer-most charge transport layer to mechanical fatigue as the imaging member belt bends and flexes over the belt drive roller and all other belt module support rollers. The outer-most layer also experiences bending strain as the backside of the belt makes sliding and/or bending contact above each backer bar's curving surface. This repetitive action of belt cycling leads to a gradual deterioration in the physical/mechanical integrity of the exposed outer charge transport layer, leading to premature onset of fatigue charge transport layer cracking. The cracks developed in the charge transport layer as a result of dynamic belt fatiguing are found to manifest themselves into copy print defects, which thereby adversely affect the image quality on the receiving paper. In essence, the appearance of charge transport cracking cuts short the imaging member belt's intended functional life.

When a production web stock consisting of several thousand feet of coated multilayered photoreceptor is obtained after finishing the charge transport layer coating/drying process, it is seen to spontaneously curl upwardly. Hence, the anticurl back coating is applied to the backside of the substrate support, opposite to the side having the charge transport layer, to counteract the curl and render the photoreceptor web stock flatness. The exhibition of upward photoreceptor curling after completion of charge transport layer coating results from thermal contraction mismatch between the applied charge transport layer and the substrate support under the conditions of elevated temperature heating/drying the wet coating and eventual cooling down to room ambient temperature. Since the charge transport layer in a typical photoreceptor device has a coefficient of thermal contraction approximately 2 to 5 times larger than that of the substrate support, upon cooling down to room ambient, greater dimensional contraction occurs in the charge transport layer than in the substrate support. This yields the upward photoreceptor curling of the web stock.

Although, in a typical photoreceptor belt, it is necessary to apply an anticurl back coating to complete a typical photoreceptor web stock material package having the desired flatness, nonetheless the application of the anticurl back coating onto the backside of the substrate support (for counter-acting the upward curling and render photoreceptor web stock flatness) has caused the charge transport layer to instantaneously build-in an internal tension strain of from about 0.15% to about 0.35% in its coating material matrix. After converting the production web stock into seamed photoreceptor belts, the internal built-in strain in the charge transport layer is then cumulatively added to each photoreceptor bending induced strain as the belt flexes over a variety of belt module support rollers during photoreceptor belt dynamic cyclic function in a machine. The consequence of this cumulative strain effect has been found to cause the acceleration and early onset of photoreceptor belt fatigue charge transport layer cracking problem. Moreover, the cumulative charge transport layer strain has also been identified as the origin of the formation of bands of charge transport layer cracking when the photoreceptor belt is parked over the belt support module during periods of machine idling or overnight and weekend shut-off time, as the belt is under constant airborne chemical vapor and contaminants exposure. The bands of charge transport layer cracking are formed at the sites corresponding to photoreceptor belt bending over each of the belt supporting rollers. The crack intensity is also seen to be most pronounced for the band at the belt segment bent and parked directly over the smallest roller, since according to the fundamentals of material mechanics, the smaller the roller diameter the belt segment is bent over, the greater is the bending strain induced in the charge transport layer surface.

Thus, there is a need for a method of fabrication of improved flexible seamed photoreceptor belts, having a charge transport layer with little or no built-in internal tension and reduced bending strain as the belts flex during machine function or during static bent belt parking over the belt module support rollers under the periods of machine idling and shut-off. Such belts will enjoy extended mechanical functioning life and effect the suppression of premature onset of charge transport layer cracking problem as well.

U.S. application Ser. No. 09/973,351, filed Oct. 8, 2001, entitled STRESS RELEASE METHOD (D/A1414), and U.S. Pat. Nos. 5,606,396, 5,089,369, 5,167,987, and 4,983,481, the disclosures of which are hereby incorporated by reference, represent prior efforts toward alleviating the problems discussed above. These efforts yielded were successful to a point. However, resolution of one problem had often been found to create new ones. For example, charge transport layer cracking life extension through selection of a supporting substrate.

Thus, there is a continued need to improve the methodology for cost effectual production of flexible imaging members, particularly through innovative processing treatment approaches that effect charge transport layer internal tension strain reduction or elimination, as well as reduction the bending/flexing strain over belt module support rollers, in multilayered electrophotographic imaging member web stocks to yield mechanically robust imaging member belts.

Embodiments thus provide improved methodology for fabricating multiple layered electrophotographic imaging member web stocks that overcome the above noted deficiencies. For example, embodiments provide an improved process for carrying out flexible electrophotographic imaging member web stocks treatment. Additionally, embodiments provide an improved and refined methodology for processing flexible multilayered electrophotographic imaging member web stocks to effect reduction of charge transport layer internal strain. Advantageously, embodiments provide an improved and refined methodology for processing flexible multilayered electrophotographic imaging member web stocks to effect reduction of charge transport layer bending strain that is induced when imaging member belt flexes or parking over belt support rollers to thereby extend the mechanical service life of the imaging member.

An improved flexible multilayered electrophotographic imaging member web stock results from embodiments. Such web stock has a charge transport layer with reduction of both internal and bending strains for effectual suppression of early onset of imaging member belt charge transport layer cracking problem caused by dynamic belt fatigue during machine belt function or induced as a result of chemical contaminants exposure at the period belt parking when machine idling or shut-off.

Embodiments thus provide an improved treatment process for carrying out multilayered flexible electrophotographic imaging member web stock charge transport layer internal stress reduction that effects the elimination of the need of an anticurl back coating from the imaging member. Additionally, embodiments provide an improved flexible multilayered electrophotographic imaging member web stock having a strain/stress reduction charge transport layer through implementation of invention cost effective web stock stress-releasing treatment production process. A typical web stock comprises a flexible substrate support layer coated over with an electrically conductive ground plane, a hole blocking layer, an optional adhesive layer, a charge generating layer, a charge transport layer, and an anticurl back coating.

A stress-release process has improved and refined features for effectual heat treatment of electrophotographic imaging member web stock to substantially eliminate the internal tension strain from the charge transport layer material matrix, as well as to reduce bending strain prior to fabrication into flexible imaging member belts. To achieve this, embodiments direct the imaging member web stock is directed, with the transport layer facing outwardly, toward the surface of a circular metallic tube making entering contact at 12 o'clock with the tube, heating the transport layer surface to a temperature above its glass transition temperature ($T_g$), then cooling the web stock to a temperature below the Tg just before the web stock leaves the tube to complete imaging member web stock stress release processing treatment. Embodiments are equally applicable for fabricating electrographic imaging members as well (e.g., ionographic members).

The stress release treated flexible electrophotographic imaging member web stock is then formed into seamed flexible belts that generally comprise a flexible supporting substrate having an electrically conductive surface layer, an optional hole blocking layer, an optional adhesive layer, a charge generating layer, a charge transport layer, a ground strip layer, and may or may not need an anticurl back coating. The flexible substrate support layer should be transparent, and can have a thickness of between about 25 µm and about 200 µm. A thickness in the range of from about 50 µm to about 125 micrometer gives better light transmission and substrate support layer flexibility. The conductive surface layer coated over the flexible substrate support can comprise any suitable electrically conductive material such as, for example, aluminum, titanium, nickel, chromium, copper, brass, stainless steel, silver, carbon black, graphite, and the like. The electrically conductive surface layer coated above the flexible substrate support layer may vary in thickness over a substantially wide ranges depending on the desired usage of the electrophotographic imaging member. However, from flexibility and partial light energy transmission considerations, the thickness of the conductive surface layer may be in a range from about 20 Å to about 750 Å. It is, nonetheless, desirable that the conductive surface layer coated over the flexible substrate support layer be between about 50 Å and 120 Å in thickness to provide sufficient light energy transmission of at least 20% transmittance to allow effective imaging member belt back erase.

BRIEF DESCRIPTION OF THE DRAWINGS

A more complete understanding of the imaging device which subjected to the processing of the present invention treatment can be obtained by reference to the accompanying drawings wherein.

Figure 1:
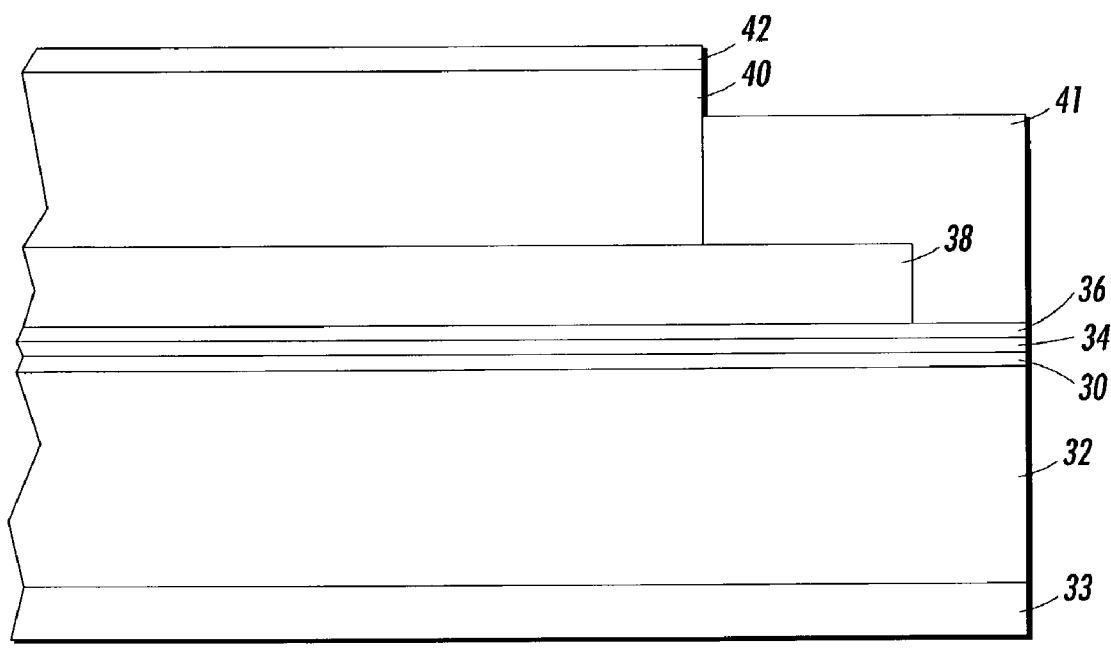
FIG. 1 illustrates a schematic partial cross-sectional view of a typical multiple layered flexible sheet of electrophotographic imaging member as seen along the width of the multi-layer member.

In the drawings and the following description, like numeric designations refer to components of like function.

DESCRIPTION

For a general understanding of the present invention, reference is made to the drawings. In the drawings, like reference numerals have been used throughout to designate identical elements.

For the sake of convenience, the invention will only be described for electrophotographic imaging members in flexible belt form even though this invention includes electrostatographic imaging members of different materials configuration. Although specific terms are used in the following description for the sake of clarity, these terms are intended to refer only to the particular structure of the invention selected for invention in the drawings, and are not intended to define or limit the scope of the invention.

A typical, negatively charged, multilayered electrophotographic imaging member of flexible web stock configuration is illustrated in FIG. 1. Generally, such a member includes a substrate support layer 32 on which a conductive layer 30, a hole blocking layer 34, a photogenerating layer 38, and an active charge transport layer 40 are formed. An optional adhesive layer 36 can be applied to the hole blocking layer 34 before the photogenerating layer 38 is deposited. Other layers, such as a grounding strip layer 41 or an overcoat layer 42 can be applied to provide various characteristics, such as improve resistance to abrasion. On the opposite surface of substrate support 32, an anticurl backing layer 33 can be applied to reduce the curling induced by the different coefficients of thermal expansion of the various layers of the belt.

Belts prepared from the imaging member web stock of the type shown in FIG. 1 are generally well known in the art, as are materials appropriate for their formation. Examples of electrophotographic imaging members having at least two electrically operative layers, including a charge generator layer and diamine containing transport layer, are disclosed in U.S. Pat. Nos. 4,265,990, 4,233,384, 4,306,008, 4,299,897, and 4,439,507, the disclosures thereof being incorporated herein in their entirety.

The thickness of the substrate support 32 can depend on factors including mechanical strength, flexibility, and economical considerations, and can reach, for example, a thickness of at least about 50 µm. A typical maximum thickness of about 150 µm can also be achieved, provided there are no adverse effects on the final electrophotographic imaging device. The substrate support 32 should not soluble in any of the solvents used in each coating layer solution, optically clear, and being thermally stable enable to stand up to a high temperature of about 150° C. A typical substrate support 32 used for the prior art imaging member fabrication has a thermal contraction coefficient ranging from about $1\times10^{-5}/°$ C. to about $3\times10^{-5}/°$ C. and with a Young's Modulus of between about $5\times10^5$ psi and about $7\times10^5$ psi. However, materials with other characteristics can be used as appropriate.

The conductive layer 30 can vary in thickness over substantially wide ranges depending on the optical transparency and flexibility desired for the electrophotographic imaging member. Accordingly, when a flexible electrophotographic imaging belt is desired, the thickness of the conductive layer can be between about 20 Å and about 750 Å, and more preferably between about 50 Å and about 200 Å for an optimum combination of electrical conductivity, flexibility and light transmission. The conductive layer 30 can be an electrically conductive metal layer formed, for example, on the substrate by any suitable coating technique. Alternatively, the entire substrate can be an electrically conductive metal, the outer surface thereof performing the function of an electrically conductive layer and a separate electrical conductive layer may be omitted.

After formation of an electrically conductive surface, the hole blocking layer 34 can be applied thereto. The blocking layer 34 can comprise nitrogen containing siloxanes or nitrogen containing titanium compounds as disclosed, for example, in U.S. Pat. Nos. 4,291,110, 4,338,387, 4,286,033, and 4,291,110, the disclosures of these patents being incorporated herein in their entirety.

An optional adhesive layer 36 can be applied to the hole blocking layer. Any suitable adhesive layer may be utilized, such as a linear saturated copolyester reaction product of four diacids and ethylene glycol. Any adhesive layer employed should be continuous and, preferably, have a dry thickness between about 200 µm and about 900 µm and, more preferably, between about 400 µm and about 700 µm. Any suitable solvent or solvent mixtures can be employed to form a coating solution of polyester. Any other suitable and conventional technique may be utilized to mix and thereafter apply the adhesive layer coating mixture of this invention to the charge blocking layer.

Any suitable photogenerating layer 38 can be applied to the blocking layer 34 or adhesive layer 36, if such an adhesive layer 36 is employed, which can thereafter be overcoated with a contiguous hole transport layer 40. Appropriate photogenerating layer materials are known in the art, such as benzimidazole perylene compositions described, for example in U.S. Pat. No. 4,587,189, the entire disclosure thereof being incorporated herein by reference. More than one composition can be employed where a photoconductive layer enhances or reduces the properties of the photogenerating layer. Other suitable photogenerating materials known in the art can also be used, if desired. Any suitable charge generating binder layer comprising photoconductive particles dispersed in a film forming binder can be used. Additionally, any suitable inactive resin materials can be employed in the photogenerating binder layer including those described, for example, in U.S. Pat. No. 3,121,006, the entire disclosure thereof being incorporated herein by reference.

The photogenerating layer 38 containing photoconductive compositions and/or pigments and the resinous binder material generally ranges in thickness of from about 0.1 µm to about 5 µm, is preferably to have a thickness of from about 0.3 micrometer to about 3 µm. The photogenerating layer thickness is related to binder content. Higher binder content compositions generally require thicker layers for photogeneration. Thicknesses outside these ranges can be selected providing the objectives of the present invention are achieved.

The active charge transport layer 40 can comprise any suitable activating compound useful as an additive dispersed in electrically inactive polymeric materials making these materials electrically active. These compounds may be added to polymeric materials which are incapable of supporting the injection of photogenerated holes from the generation material and incapable of allowing the transport of these holes therethrough. This will convert the electrically inactive polymeric material to a material capable of supporting the injection of photogenerated holes from the generation material and capable of allowing the transport of these holes through the active layer in order to discharge the surface charge on the active layer. Thus, the active charge transport layer 40 can comprise any suitable transparent organic polymer or non-polymeric material capable of supporting the injection of photogenerated holes and electrons from the trigonal selenium binder layer and allowing the transport of these holes or electrons through the organic layer to selectively discharge the surface charge. The active charge transport layer 40 not only serves to transport holes or electrons, but also protects the photoconductive layer 38 from abrasion or chemical attack and therefor extends the operating life of the photoreceptor imaging member. The charge transport layer 40 should exhibit negligible, if any, discharge when exposed to a wavelength of light useful in xerography, for example, 4000 Å to 9000 Å. Therefore, the charge transport layer is substantially transparent to radiation in a region in which the photoconductor is to be used. Thus, the active charge transport layer is a substantially non-photoconductive material which supports the injection of photogenerated holes from the generation layer. The active transport layer is normally transparent when exposure is effected through the active layer to ensure that most of the incident radiation is utilized by the underlying charge carrier generator layer for efficient photogeneration. The charge transport layer in conjunction with the generation layer in the instant invention is a material which is an insulator to the extent that an electrostatic charge placed on the transport layer is not conducted in the absence of illumination.

The charge transport layer forming mixture preferably comprises an aromatic amine compound. An especially preferred charge transport layer employed in one of the two electrically operative layers in the multi-layer photoconductor of this invention comprises from about 35 percent to about 45 percent by weight of at least one charge transporting aromatic amine compound, and about 65 percent to about 55 percent by weight of a polymeric film forming resin in which the aromatic amine is soluble. The substituents should be free form electron withdrawing groups such as $NO_2$ groups, CN groups, and the like, and are typically dispersed in an inactive resin binder.

The charge transport layer 40 should be an insulator to the extent that the electrostatic charge placed on the charge transport layer is not conducted in the absence of illumination at a rate sufficient to prevent formation and retention of an electrostatic latent image thereon. In general, the ratio of the thickness of the hole transport layer to the charge generator layer is preferably maintained from about 2.1 to 200:1 and in some instances as great as 400:1. Generally, the thickness of the transport layer 40 is between about 5 µm and about 100 µm, but thickness outside this range can also be used provided that there are no adverse effects. Typically, it has a Young's Modulus in the range of from about $2.5 \times 10^5$ psi to about $4.5 \times 10^5$ psi and with a thermal contraction coefficient of between about $6 \times 10^{-5}/°$ C. and about $8–10^{-5}/°$ C. Furthermore, the charge transport layer also typically has a glass transition temperature $T_g$ of between about 75° C. and about 100° C.

Other layers, such as conventional ground strip layer 41 comprising, for example, conductive particles dispersed in a film forming binder may be applied to one edge of the photoreceptor in contact with the conductive layer 30, hole blocking layer, adhesive layer 36 or charge generating layer 38. The ground strip 41 can comprise any suitable film forming polymer binder and electrically conductive particles. Typical ground strip materials include those enumerated in U.S. Pat. No. 4,664,995. The ground strip layer 41 may have a thickness from about 7 µm to about 42 µm, and preferably from about 14 µm to about 23 µm. Optionally, an overcoat layer 42, if desired, can also be utilized to improve resistance and provide protection to imaging member surface abrasion.

The charge transport layer 40 typically has a great thermal contraction mismatch compared to that of the substrate support 32. As a result, the prepared flexible electrophotographic imaging member exhibits spontaneous upward curling due to the result of larger dimensional contraction in the charge transport layer than the substrate support, especially as the imaging member cools down to room ambient after the heating/drying processes of the applied wet charge transport layer coating. An anti-curl back coating 33 can be applied to the back side of the substrate support 32 (which is the side opposite the side bearing the electrically active coating layers) to induce flatness. The anticurl back coating 33 can comprise any suitable organic or inorganic film forming polymers that are electrically insulating or slightly semi-conductive.

The anticurl back coating 33 should have a thermal contraction coefficient of at least about $1 \times 10^{-5}/°$ C. greater than that of the substrate support to be considered satisfactory. Typically, a substrate support has a thermal contraction coefficient of about $2 \times 10^{-5}/°$ C. However, anti-curl back coating with a thermal contraction coefficient at least $+2 \times 10^{-5}/°$ C. larger than that of the substrate support is preferred to produce an effective anti-curling result. The selection of a thermoplastic film forming polymer for the anti-curl back coating application has to be satisfying all the physical, mechanical, optical, and importantly, the thermal requirements above. Polymer materials which can meet these invention requirements include a variety of polymers as is known in the art. These polymers can be block, random or alternating copolymers. Furthermore, the selected film forming thermoplastic polymer for anticurl back coating 33 application, if desired, can be of the same binder polymer used in the charge transport layer 40.

The fabricated multilayered, flexible electrophotographic imaging member web stock of FIG. 1 is then cut into rectangular sheets and converted into imaging member belts. The two opposite edges of each imaging member cut sheet are then brought together by overlapping and may be joined by any suitable method, including ultrasonic welding, gluing, taping, stapling, and pressure and heat fusing to form a continuous imaging member seamed belt, sleeve, or cylinder. From the viewpoint of considerations such as ease of belt fabrication, short operation cycle time, and mechanical strength of the fabricated joint, the ultrasonic welding process is more advantageous. The prepared flexible imaging belt can therefore be employed in any suitable and conventional electrophotographic imaging process that utilizes uniform charging prior to imagewise exposure to activating electromagnetic radiation.

As known from the principles of material mechanics, as the flexible imaging member seamed belt bends over the exterior surfaces of rollers of a belt module within an electrophotographic imaging machine during dynamic belt cycling function, the bottom surface of the anticurl back coating 33 of the flexible imaging member belt is compressed. In contrast, the top surface of charge transport layer 40 is stretched and placed under tension. This is attributable to the fact that the top and bottom surfaces move in a circular path about the circular roller. Since the top surface of charge transport layer 40 is at greater radial distance from the center of the circular roller than the bottom surface of anticurl back coating 33, the top surface must travel a greater distance than the bottom surface in the same time period. Therefore, the top surface must be under tension relative to a generally central portion of the flexible imaging member seamed belt (the portion of the flexible imaging member seamed belt generally extending along the center of gravity of the flexible imaging member seamed belt). Likewise, the bottom surface must be compressed relative to the generally central portion of the flexible imaging member seamed belt (the portion of the flexible imaging member seamed belt generally extending along the center of gravity of the flexible imaging member seamed belt). Consequently, the bending stress at the belt top surface will be tension stress, and the bending stress at the belt bottom surface will be compression stress as the imaging member belt flexes over each belt module support roller under a machine functioning condition.

From fracture mechanics, it is known that compression stresses, such as that at the bottom belt surface, rarely cause mechanical failure. Tension stresses, such as that induced at the top belt surface, however, are a more serious problem. The tension stress, under constant belt fatiguing condition, has been determined to be the root cause that promotes the development of charge transport layer 40 cracking problem. The cracks, though initiated in the charge transport layer 40, continue to propagate to the generator layer 38, extend to the adhesive interface layer 36, cut through the blocking layer 34, and reach further to the conductive layer 30.

However, multiple layer belts with significant difference between layer thermal contraction coefficients exhibit spontaneous upward imaging member curling, due in part to the dimensional contraction mismatch between these layers. The imaging members thus can require an anticurl back coating 33 applied to the back side of the substrate support layer 32 to balance the upward lifting force. This induces imaging member flatness prior to belt preparation, but yields belts with built-in internal strain. This internal strain can reach level of, for example, approximately 0.28%, and is additive to the bending strain induced during imaging member belt fatigue under machine operational conditions. The cumulative effect of internal strain plus bending strain further promotes the early onset of dynamic fatigue charge transport layer cracking during imaging member belt cyclic machine function. Moreover, bands of charge transport layer cracking caused by exposure to airborne chemical contaminants have also been found to form at imaging member belt segments parked/bent directly over each belt module support rollers over periods of machine idling and shut-off time.

Both dynamic belt fatigue and chemical contaminant exposure induced crackings in the charge transport layer 40 of the imaging member seamed belt are serious mechanical failures that should be resolved and/or avoided. These cracks manifest as copy printout defects, shortening the usefulness and service life of the flexible imaging member seamed belts.

Figure 2:
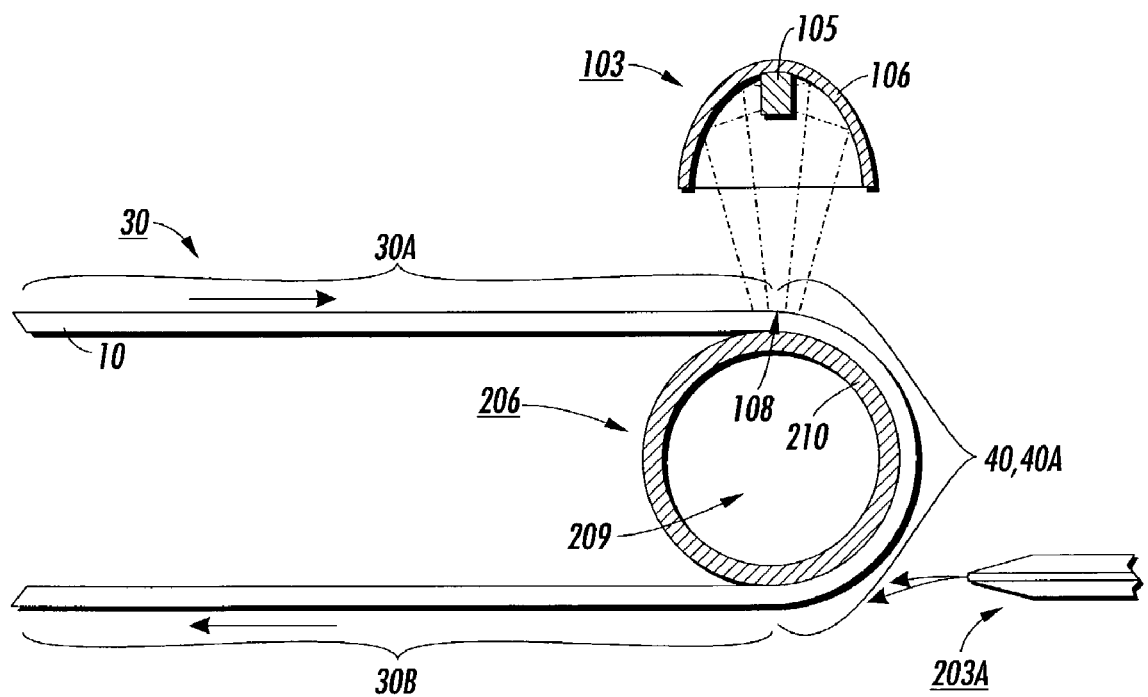
FIG. 2 shows a schematic representation of a prior art heat treatment processing employed to impart electrophotographic imaging member web stock charge transport layer stress release outcome.

To extend the charge transport layer cracking life, innovative imaging member web stock processing treatment has been successfully pursued and demonstrated to reduce the charge transport layer internal strain, as well as in reduction of imaging member belt bending strain over belt module support rollers, according to the exemplary stress-release processing representation of a prior art shown in FIG. 2. An electrophotographic imaging member, unwound from, for example, a supplied roll-up web stock 10, and is directed with the charge transport layer facing outwardly, for example under a one pound per linear inch tension and a web stock transport speed of about 10 feet/min, toward a one-inch outer diameter free-rotation processing treatment metal tube 206 having an arcuate Teflon® coated outer surface 210, and an annulus 209 with passing cool water to maintain constant treatment tube temperature. The imaging member web stock 10 under 25° C. ambient, makes an entering contact at 12 o'clock with the tube 206 and is conformed to the arcuate surface 210. A powerful IR emitting tungsten halogen quartz heating source 103, positioned directly above, brings upon an instant localized temperature elevation to the charge transport layer to about 10° C. above its glass transition temperature ($T_g$) to facilitate molecular motion of the polymer in the layer and effect instant charge transport layer stress-release while the segment of the web-stock is under bending conformance contact over the arcuate surface 210. The heat source 103 is an integrated unit having a length sufficiently covering the whole width of the imaging member web stock; it consists of a hemi-ellipsoidal cross-section elongated reflector 106 and a halogen quartz tube 105 positioned at one focal point inside the reflector 106 such that all the IR radiation energy emitted form tube 105 was reflected and converged at the other focal point outside the reflector 106 to give a 6 mm width focused heating region 108 that effects instant charge transport layer temperature elevation to beyond its $T_g$. The heated segment of charge transport layer after exposure to the heating region 108 began to cool down to below the $T_g$, through direct heat conduction to tube 206 and as well as heat transfer to ambient air, as the web stock in continuous motion is transported away from heat source 103. A further and final charge transport layer cooling is assured by air impingement from an air knife 203A (directing a high velocity, preferably super-sonic, narrow stream of cool air onto the surface of the web stock) positioned at 4 o'clock to tube 206 prior to the web stock segment emerging from the curved contacting zone region to complete the imaging member web stock stress-release treatment process. In this figure, the numerals 30, and 30A are paths where the transporting imaging member is freely suspended, while 40 and 40A are contact zones at which the segment of the imaging member is intimately riding over the treatment tube 206.

The material configuration of a typical electrophotographic imaging member web stock 10, like that shown in FIG. 1, used for the stress release processing treatment according to the illustrative representation of FIG. 2 comprises a 3.5 mils flexible substrate support layer 32, about 100 Angstrom thickness of the titanium conductive layer 30, a 0.02 micrometer hole blocking layer 34, a 0.03 micrometer adhesive layer 36, a 0.08 micrometer photogenerating layer 38, a 29 μm charge transport layer 40, a 18 micrometer conventional electrically conductive ground strip 41 coated along one edge of the imaging member web stock adjacent to the charge transport layer 40, and a 17 μm anticurl back coating 33 to give a complete imaging member web stock material package having reasonably good physical flexibility and flatness. With this imaging member web stock package, the processing treatment carried out though is seen to produce good charge transport layer stress releasing result, but only found to be effectual at a web stock transport speed of not to exceed 8 feet/min. The low web stock processing treatment speed limitation diminishes the practical value of the treatment process, making it less attractive for cost effective electrophotographic imaging member production implementation consideration. The impediments to high speed imaging member web stock processing treatment shown in FIG. 2 have been determined to be (1) insufficient heating capacity to substantially instantly, or at least extremely rapidly, bring the web stock segment up to the intended temperature target; (2) inadequate or insufficient cooling capacity to bring the segment temperature down quickly enough to effect charge transport layer stress release result prior to web stock exiting from the treatment roller 206; or, (3) insufficient capacity in both heating and cooling of web stock during treatment processing.

Figure 3:
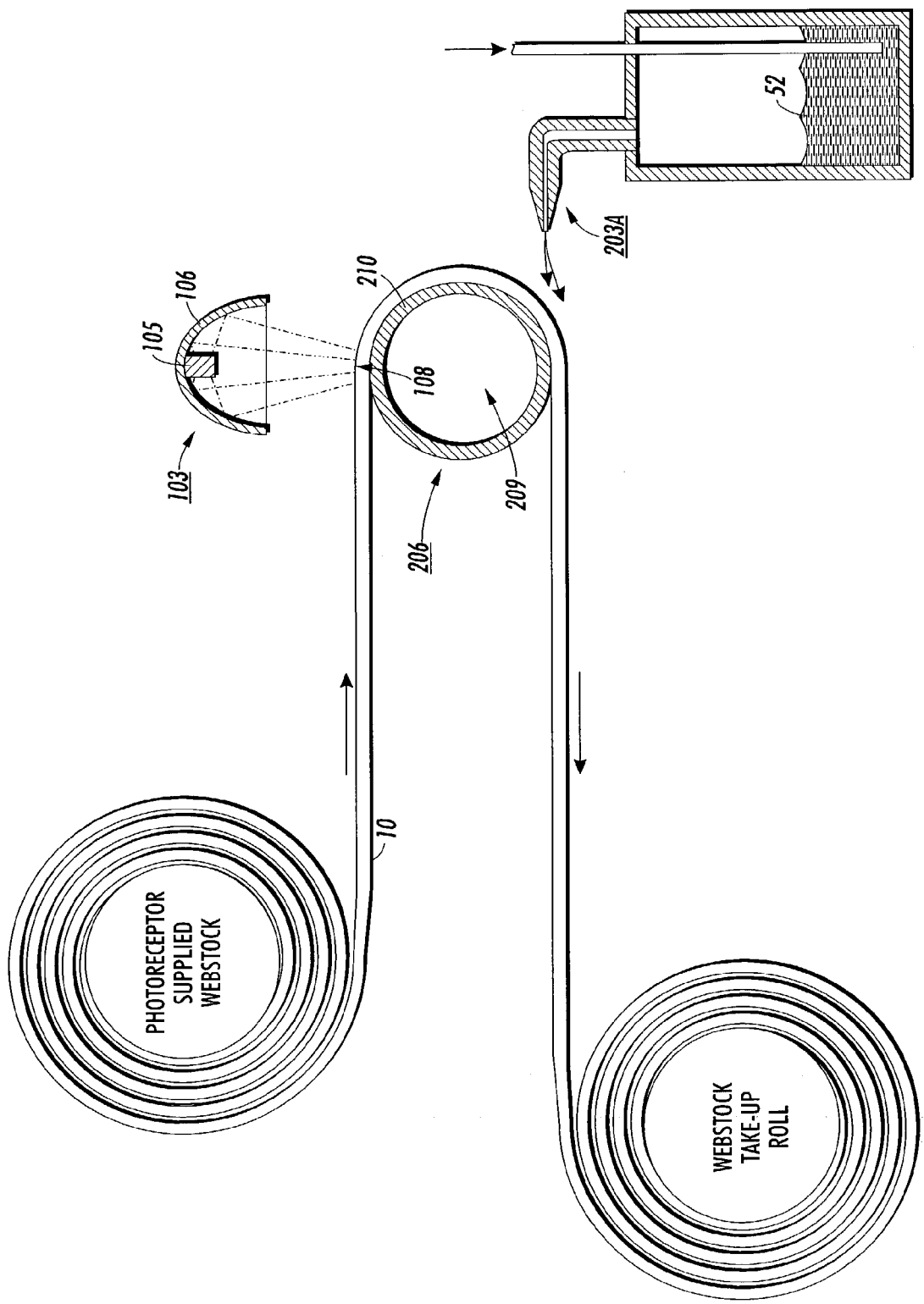
FIGS. 3 to 6 show schematic representations of several present invention heat treatment processing variances that yield effectual high speed electrophotographic imaging member web stock charge transport layer stress release processing treatment result.
Figure 4:
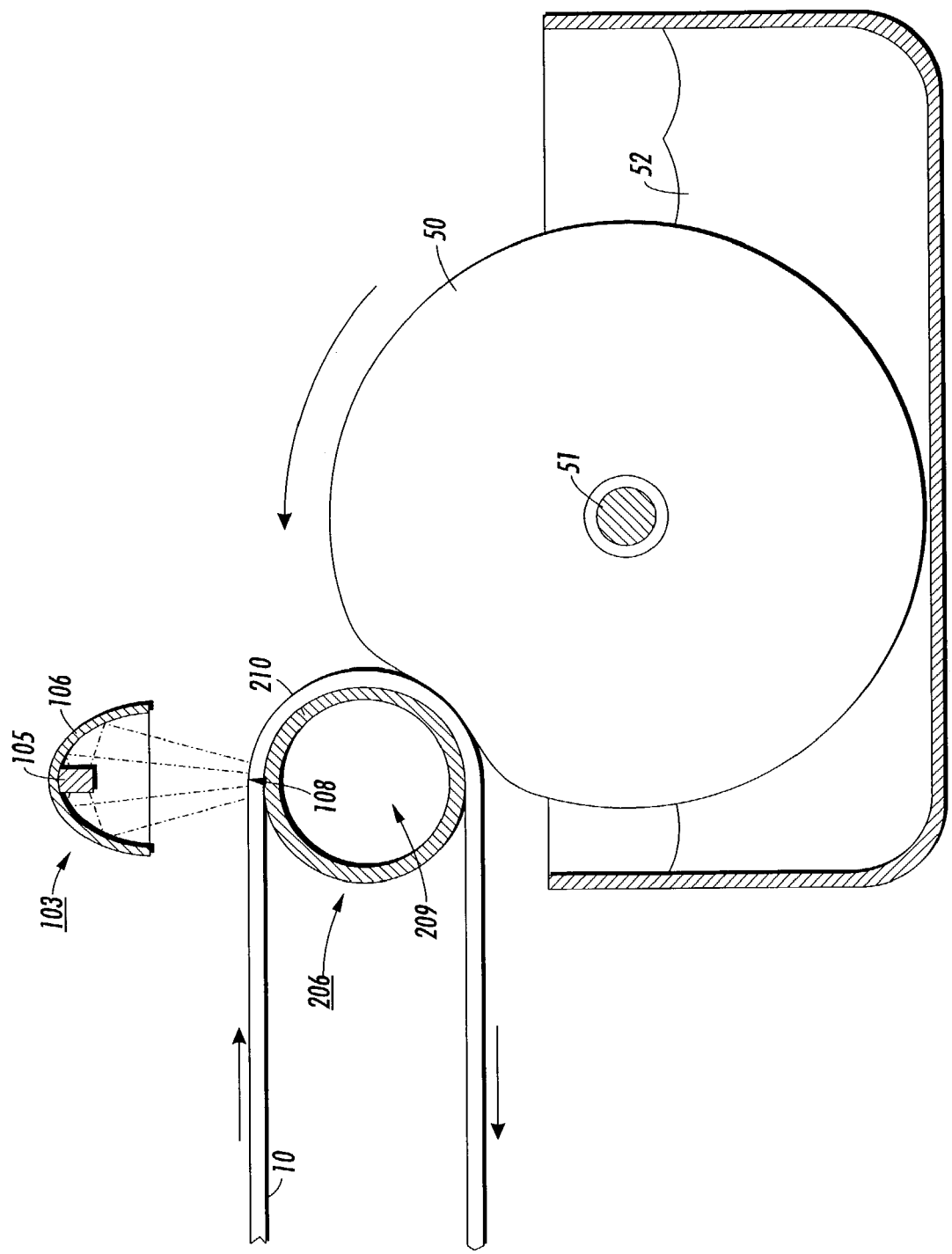
Figure 5:
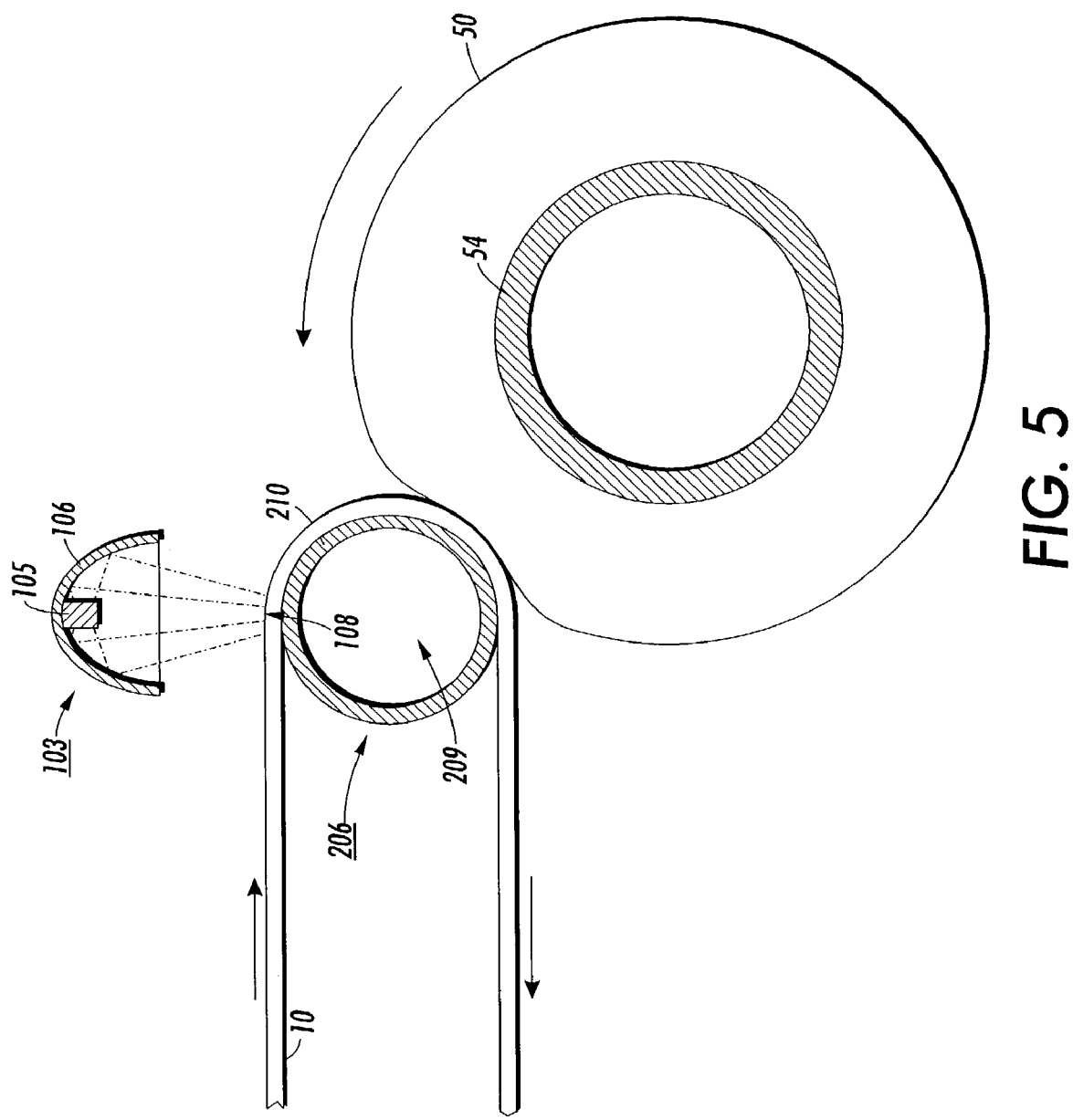
Figure 6:
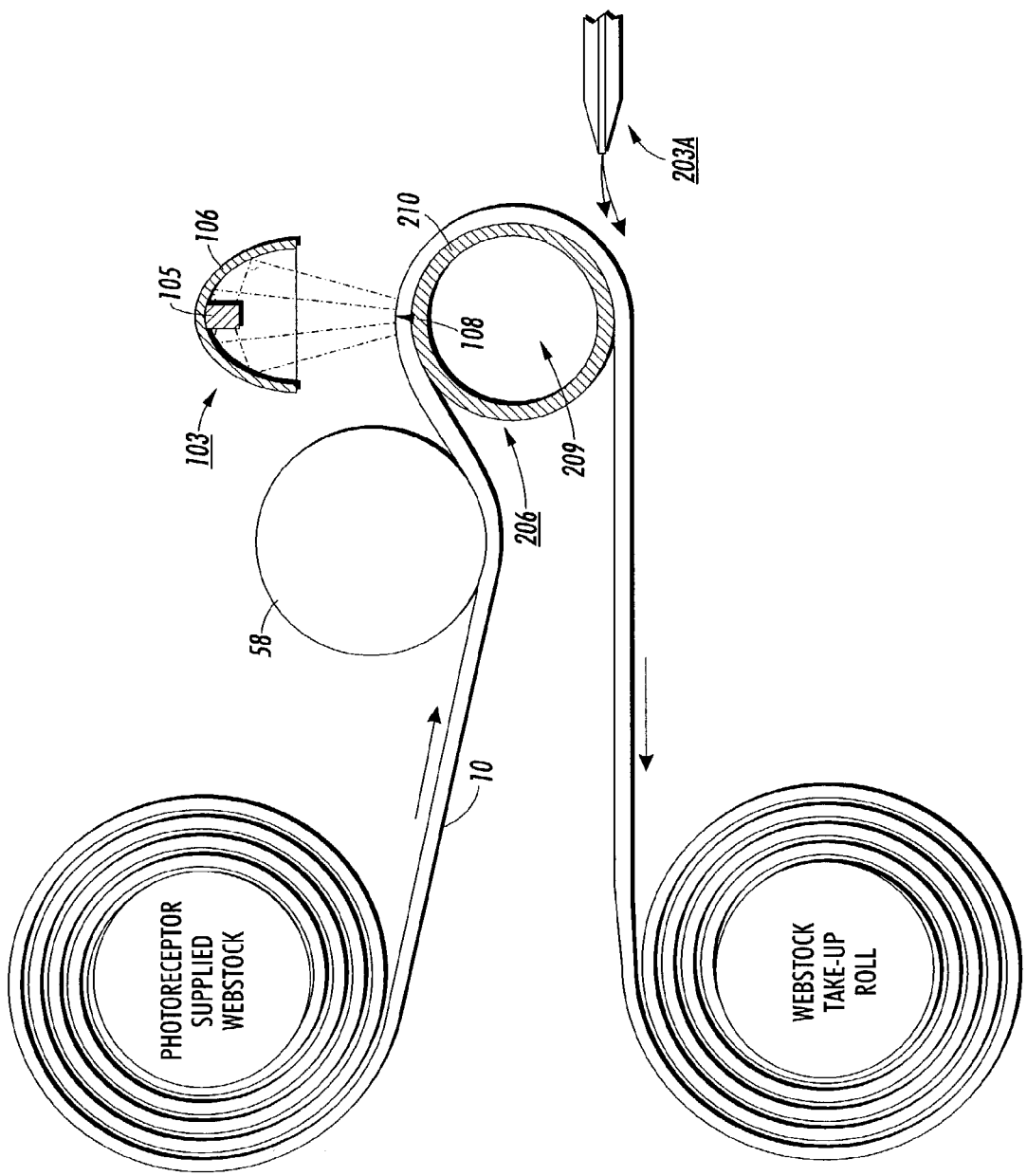

To overcome these deficiencies, embodiments provide a modified fine tuning treatment process that can provide reduce strain/stress in imaging member web stock at higher, more practical speeds. In particular, embodiments reduce strain/stress in a layer, such as a charge transport layer, of imaging member web stock. FIGS. 3 to 5 schematically illustrate embodiments that advantageously focus on effectual cooling capacity enhancement to enable high speed imaging member web stock processing. FIG. 6 schematically illustrates embodiments employing a combination of heating and cooling capacity enhance to reduce strain/stress. In addition, embodiments can advantageously employ a treatment tube 206 outer diameter of between about 0.5 inch and about 3 inches. An outer diameter in the range of from about 0.5 inch to about 2 inches can provide more advantageous processing operation control stress release.

FIG. 3 schematically illustrates embodiments employing a modification and refinement process related to that of FIG. 2 to enhance cooling capacity. This cooling capacity enhancement can improve imaging member web stock charge transport layer stress release processing. As shown in this figure, a cooling air stream is first bubbling and passed through a water medium 52 inside a container to bring along atomized liquid water mist to the air delivery knife 203 for impacting quick impinging air cooling result. Since air is a poor heat conductor and has low heat capacity, an air stream carrying atomized liquid water can provide the heat extraction capability increase by many times.

Referring to FIG. 3, which schematically illustrates an exemplary embodiment of a process of the present invention for treating a flexible multilayered electrophotographic imaging member web stock having material configuration identical to that of imaging member 10 described in FIG. 1. This invention process with the intent to effect the result of charge transport layer 40 internal stress release is carried out by continuous processing treatment. The imaging member 10 web stock is, for example, unwound from an imaging member supply roll with the charge transport layer 16 facing outwardly is directed toward a processing treatment free rotating tube 206 having an arcuate outer surface 210 and an annular chamber 209. In embodiments, the roll can have around 6000 feet of web stock, and the speed can be around one pound per linear inch width. The imaging member 10 web stock, at ambient temperature of about 25° C., makes an entering contact at 12 o'clock and conforms to the arcuate surface 210 of tube 206. As shown in the figure, a high power heat source 103, such as an infrared emitting tungsten halogen quartz heating source, positioned directly above brings an instant localized temperature elevation in the charge transport layer 40 of the bending/contacting imaging member 10 to between about 5° C. and about 25° C. over its glass transition temperature $T_g$. The glass transition temperature, $T_g$, is defined as the temperature at which the polymer material changes from a rigid to a flexible state. Heating the charge transport layer 40 to such a temperature range above its $T_g$ facilitates molecular motion in the polymer and effects release of the bending induced and internal built-in stress in the charge transport layer 40 while the segment of imaging member 10 is in bending conformance over the arcuate surface 210. The heating source 103 can be, for example, an integrated unit having a length covering the width of the imaging member 10 and can include a hemi-ellipsoidal shaped cross-section elongated reflector 106 and a halogen quartz tube 105 positioned at a focal point inside the reflector 106, such that all the infrared radiant energy emitted from tube 105 is reflected and converges at the other focal point outside the reflector 106. A focused heating line 108 over the charge transport layer 16 surface can substantially instantaneously bring about temperature elevation. A line width of about 6 mm can provide sufficient heating in embodiments, though the dimensions and materials used in particular situations may require larger or smaller value.

The heated section of the charge transport layer 40 after exposure to the focused heating line 108 will then be gradually cooling down when the imaging member 10 is transported away from the heat source 103, through direct heat conduction to tube 206 as well as convection to the surroundings, since the web stock has been set to motion in a constant processing treatment speed over the arcuate surface 210. A final cooling down of the charge transport layer 40 and the web stock is facilitated by a cooling air stream delivered by an air knife positioned between about 4 o'clock and 6 o'clock to assure temperature lowering of the exiting imaging member section to a temperature of at least about 20° C. (preferably 40° C.) below the $T_g$ of the charge transport layer 40 to yield permanent stress release result. The cooling air stream is first bubbling and passed through a water medium 52 inside a container to bring along atomized liquid water mist to the air delivery knife 203, such that the air stream impinging on the imaging member web stock can quickly be cooled down by the large heat extraction effect derived from both the large water heat capacity constant and its latent heat of evaporation. The annular chamber 209 of the treatment tube 206 can be filled with air, or can have a coolant passing therethrough such as water, liquid nitrogen, alcohol, or another suitable coolant.

An alternative cooling enhancement process of the present invention in embodiments is shown in FIG. 4. In this process, the air impingement cooling device can be replaced with a low durometer (about 10 Shore A hardness) soft free rotating silicone cooling nip-roller 50, having a frictionless rotating shaft 51, to impact quick imaging member web stock cooling and effect high speed treatment processing result, since solid conduction contact cooling is much more efficient than air stream cooling, since air is a relatively poor heat conductor. A water cooling bath 52 can be used to quickly cool the roll 50. In such cases, the water cooling bath 52 with partial submersed silicone nip-roll 50 is controlled at a substantially constant temperature to ensure steady state treatment processing. Direct liquid water contacting an imaging member can weaken imaging member internal layer adhesion. However, since the silicone nip-roller 50 has a low surface energy of about 18 dynes/cm, direct liquid water wetting of the surface of imaging member web stock 10, brought upon by the silicone roller, is safely prevented. Furthermore, it is preferred that the soft silicone roller material matrix also contain metallic particle dispersion to increase its heat conduction capability.

FIG. 5 is an embodiment invention processing variance modified from FIG. 4, in which the water cooling bath 52 and the frictionless shaft 51 are substituted with a metallic cooling tube 54 with cooling water passing through its annulus to control and maintain constant processing temperature as well as providing quick imaging member web stock cooling down result.

FIG. 6 schematically illustrates embodiments that employ a combination of enhanced heating and enhanced cooling to accommodate high imaging member web stock transporting speed for achieving effective charge transport layer stress release outcome. A substantially frictionless or low friction heating roller 58 can be added and positioned a short distance from the treatment tube 206 to pre-heat the imaging member web stock. The added heating roller 58 can be a solid electrically heated roller having Teflon coating on the surface; otherwise it can be a free rotating Teflon coated surface metal tube with hot water passing through its annulus to provide heating. Alternatively, embodiments can employ an additional IR heating source, like that of 103, for example, in which dual IR heating beams are employed. To enhance the cooling effect, the air knife 203A is provided with an impinging cooled air stream, liquid nitrogen, $CO_2$ snow, sub-cooled alcohol, low temperature cooling water, or another suitable coolant to accelerate the real time impact for quick imaging member web stock temperature lowering effect. One added benefit of employing the added heating roller 58 (or heating tube) is also that the wrap angle of the imaging member web stock around the treatment tube 206 can thereby be conveniently increased to more than 180° and give more surface area for achieving effectual treatment processing.

For electrographic imaging members, a flexible dielectric layer overlying the conductive layer can be substituted for the active photoconductive layers. Any suitable, conventional, flexible, electrically insulating, thermoplastic dielectric polymer matrix material may be used in the dielectric layer of the electrographic imaging member. If desired, the flexible belts preparation methods of embodiments can be applied to other purposes in which belt cycling durability, such as against fatigue surface cracking, is an important issue.

The invention will further be illustrated in the following non-limiting examples, it being understood that these examples are intended to be illustrative only and that the invention is not intended to be limited to the materials, conditions, process parameters and the like recited herein. All proportions are by weight unless otherwise indicated.

CONTROL EXAMPLE I

A flexible electrophotographic imaging member web stock, in reference to the illustration in FIG. 1, was prepared by providing a 0.01 μm thick titanium layer 30 coated onto a flexible biaxially oriented Polynaphthalate substrate support layer 32 (Kadalex®, available from ICI Americas, Inc.) having a thermal contraction coefficient of about $1.8 \times 10^{-5}/°$C., a glass transition temperature Tg of 130° C., and a thickness of 3.5 mils or 88.7 μm, and applying thereto, by a gravure coating process, a solution containing 10 grams gamma aminopropyltriethoxy silane, 10.1 grams distilled water, 3 grams acetic acid, 684.8 grams of 200 proof denatured alcohol and 200 grams heptane. This layer was then dried at 125° C. in a forced air oven. The resulting blocking layer 34 had an average dry thickness of 0.05 μm measured with an ellipsometer.

An adhesive interface layer was then extrusion coated by applying to the blocking layer a wet coating containing 5 percent by weight based on the total weight of the solution of polyester adhesive (Mor-Ester 49,000®, available from Morton International, Inc.) in a 70.30 volume ratio mixture of tetrahydrofuran/cyclohexanone. The resulting adhesive interface layer 36, after passing through an oven, had a dry thickness of 0.095 μm.

The adhesive interface layer 36 was thereafter coated with a photogenerating layer 38. The photogenerating layer dispersion is prepared by introducing 0.45 grams of IUPILON 200® poly(4,4'-diphenyl)-1,1'-cyclohexane carbonate, available from Mitsubishi Gas Chemical Corp and 50 mL of tetrahydrofuran into a glass bottle. To this solution is added 2.4 grams of Hydroxygallium Phthalocyanine and 300 grams of ⅛ inch (3.2 mm) diameter stainless steel shot. This mixture is then placed on a ball mill for 20 to 24 hours. Subsequently, 2.25 grams of poly(4,4'-diphenyl)-1,1'-cyclohexane carbonate is dissolved in 46.1 grams of tetrahydrofuran, then added to this hydrogallium phthalocyanine slurry. This slurry is then placed on a shaker for 10 minutes. The resulting slurry was, thereafter, extrusion coated onto the adhesive interface 36 by extrusion application process to form a layer having a wet thickness of 0.25 mL. However, a strip about 10 mm wide along one edge of the substrate web bearing the blocking layer and the adhesive layer was deliberately left uncoated by any of the photogenerating layer material to facilitate adequate electrical contact by the ground strip layer that was applied later. This photogenerating layer was dried at 135° C. for 5 minutes in a forced air oven to form a dry thickness photogenerating layer 38 having a thickness of 0.4 μm layer.

This coated imaging member web was simultaneously co-extrusion overcoated with a charge transport layer 40 and a ground strip layer 41. The charge transport layer was prepared by introducing into an amber glass bottle a weight ratio of 1:1 N,N'-diphenyl-N,N'-bis(3-methylphenyl)-1,1'-biphenyl-4,4'-diamine and Makrolon 5705®, a polycarbonate resin having a weight average molecular weight of about 120,000 commercially available from Farbensabricken Bayer A. G. The resulting mixture was dissolved to give a 15 percent by weight solids in 85 percent by weight methylene chloride. This solution was applied over the photogenerator layer 38 to form a coating which, upon drying, gave a charge transport layer 40 thickness of 29 μm, a thermal contraction coefficient of $6.5 \times 10^{-5}/°$ C., and a glass transition temperature, $T_g$, of about 85° C.

The approximately 10 mm wide strip of the adhesive layer 36 left uncoated by the photogenerator layer 38 was coated with a ground strip layer during a co-coating process. This ground strip layer 41, after drying at 125° C. in an oven and eventual cooling to room ambient, had a dried thickness of about 19 μm. This ground strip was electrically grounded, by conventional means such as a carbon brush contact means during conventional xerographic imaging process. The electrophotographic imaging member web stock, at this point if unrestrained, would spontaneously curl upwardly into a tube due to the thermal contraction mismatch between the charge transport layer 40 and the substrate support layer 32, resulting in greater charge transport layer 40 dimensional shrinkage than the substrate support layer 32 which thereby causing substantial internal stress built-in in the charge transport layer 40. The curled electrophotographic imaging member web stock was used to serve as a control.

CONTROL EXAMPLE II

Another flexible electrophotographic imaging member web stock was prepared by following the procedures and using materials as described in the Control Example I, but with the exception that the imaging member web stock curling was controlled by application of an anticurl back coating 33 to render the desired imaging member web stock flatness.

An anticurl back coating solution was prepared by combining 8.82 grams of polycarbonate resin (Makrolon 5705®, available from Bayer AG), 0.72 gram of polyester resin (Vitel PE-200®, available from Goodyear Tire and Rubber Company) and 90.1 grams of methylene chloride in a glass container to form a coating solution containing 8.9 percent by weight solids. The container was covered tightly and placed on a roll mill for about 24 hours until the polycarbonate and polyester were dissolved in the methylene chloride to form the anticurl back coating solution. The anticurl back coating solution was then applied to the rear surface of the substrate support layer 32 (the side opposite the photogenerator layer and charge transport layer) of the imaging member web stock and dried at 125° C. to produce a dried anticurl back coating 33 thickness of about 17.5 μm. The resulting electrophotographic imaging member web stock had the desired flatness and with the same material structure as that schematically illustrated in FIG. 1 is a complete imaging member full device. The fabricated electrophotographic imaging member web stock was also used to serve as another imaging member control.

COMPARATIVE EXAMPLE I

The flexible electrophotographic imaging member web stock 10 full device of Control Example II was used for charge transport layer (CTL) heat stress release processing treatment according to the pictorial representation shown in FIG. 2. This invention concept, with the intent to reduce the internal stress in CTL 40, was conducted through this continuous web stock heat treatment processing.

In essence, the imaging member web stock 10 was unwound from a 6,000 feet roll-up imaging member supply roll was directed (with the CTL 40 facing outwardly, under a one pound per linear inch width web tension, and a web stock transport speed of 10 feet per minute) toward a one-inch outer diameter free rotation processing treatment metal tube 206 having an arcuate outer surface 210, a wall thickness, and an annulus 209. The imaging member web stock 10, under 25° C. ambient temperature, made an entering contact at 12 o'clock with the tube 206 and conformed to the arcuate surface 210. A powerful infrared emitting tungsten halogen quartz heating source 103, positioned directly above, brought upon an instant localized temperature elevation to the CTL 40 to 10° C. above its $T_g$ to facilitate molecular motion and effect instant stress release from the CTL 40 while the segment of the imaging member web stock 10 was in bending conformance contact over the arcuate surface 210. The heating source 103 was an integrated unit having a length sufficiently covering the whole width of the imaging member segment; it consist of a hemi-ellipsoidal cross-section elongated reflector 106 and a halogen quartz tube 105 positioned at one focal point inside the reflector 106 such that all the infrared radiant energy emitted from tube 105 was reflected and converged at the other focal point outside the reflector 106 to give a 6 mm width focused heating line 108 that effected instant CTL 40 temperature elevation beyond its $T_g$.

The heated segment of CTL 40 after exposure to the heating line 108 would begin to cool down, through direct heat conduction to tube 206 and heat transfer to ambient air, as the imaging member web stock in constant motion was transported away from heat source 103. A further and final CTL 40 cooling was assured by air an impingement from an air knife positioned at 4 o'clock to the tube 206 prior to imaging member web stock segment 10 emerging from tube 206 to complete the treatment process. In this charge transport layer stress release processing treatment experimental demonstration, two different imaging member transporting speeds, a 7 feet/min. and a 15 feet/min., had been tried to assess invention processing effectiveness.

COMPARATIVE EXAMPLE II

The flexible electrophotographic imaging member web stock having no anticurl back coating layer, prepared according to Control Example I, was also subjected to the exact same CTL stress release processing treatment procedures by following the descriptions in the preceding Comparative Example I, again using same two different imaging member web stock transporting speeds.

COMPARATIVE EXAMPLE III

The flexible electrophotographic imaging member web stock having no anticurl back coating layer, prepared according to Control Example I, was also subjected to the exact same CTL stress release processing treatment procedures, by following the descriptions in the preceding Comparative Example I and again using same two different imaging member web stock transporting speeds. The air knife 203A was impinging $CO_2$ snow instead of air to effect fast imaging member web stock cooling, and dual IR heating beams were employed to effect rapid CTL temperature elevation to at least 5° C. beyond its Tg.

MECHANICAL BELT CYCLING TEST EXAMPLE

The flexible electrophotographic imaging member web stocks of Control Examples I and II and Comparative Examples I to III were each cut to precise dimensions of 440 mm width and 2,808 mm in length. The opposite ends of each cut imaging member sheet were secured to give 1 millimeter overlap and ultrasonically welded, using 40 KHz horn frequency, in the long dimension, to form a seamed flexible imaging member belt for fatigue dynamic electrophotographic imaging test in a selected xerographic machine utilizing a belt module comprises numerous belt support rollers, in particular a small one inch diameter paper stripping roller.

The dynamic machine belt cycling test results obtained showed that the onset of fatigue induced charge transport layer cracking was found to be evident much earlier for both control imaging member belts prepared directly from Control Examples I and II than those seen for all the stress release processing treated imaging member belt counterparts of the Comparative Examples I, II, and III. Delaying of fatigue charge transport layer cracking was realized by subjecting the imaging member web stock through stress release processing treatment of embodiments. The cracking life extension gain was, however, slight for the higher web stock processing treatment speed of 15 feet/min., but significantly effectual only for the lower 7 feet/min. web stock speed imaging belt fabricated from Comparative Examples I and II, employing impinging air cooling. By comparison, when the impinging air knife 206A was provided to deliver impinging $CO_2$ snow, according to Comparative Example III, the resulting imaging member belts prepared from both 7 feet/min. and 15 feet/min. web stock processing treatment speeds were seen to give approximately identical fatigue charge transport layer cracking life extension gain. These fatigue cycling belt life results obtained from machine testings are a definite indication that quick imaging member web stock cooling was significantly advantageous to bring about effective charge transport layer stress release outcome for life extension. Comparison of the functional belt life enhancement seen among all the imaging member belts, fabricated from web stocks through the processing treatment condition variances of the three Comparative Examples, leads one to conclude that the inventive processing treatment works. In particular, the treatment should use: (1) at least one high power heat source, such as a localized focused heating line, to substantially instantaneously and sufficiently bring about charge transport layer temperature above its $T_g$ for effectual stress releasing the charge transport layer while the imaging member web stock was bent over the treatment tube, and (2) a final cooling device directed over the charge transport layer should be employed to achieve rapid charge transport layer temperature lowering prior to web stock exiting at 6 o'clock position from the treatment tube. Such enhanced heating and cooling can enhance treatment and allow higher speed imaging member web stock processing treatment to effect charge transport layer stress release result and impact cracking life extension.

In summary, the integration of an efficient heat energy delivery system and in combination of employing an enhanced heat extraction capability technique for quick imaging member cooling to the invention process is advantageous and represents an effectual improvement over the prior art in achieving electrophotographic imaging member web stock stress release outcome for transporting motion of imaging member web stock at high speed.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A stress/strain relief process for a flexible, multilayered web stock comprising:
    transferring a multilayered web stock from a first location to a second location, wherein the web stock includes at least one layer to be treated, the at least one layer to be treated having a coefficient of thermal expansion different from a coefficient of thermal expansion of another layer;
    heating at least the at least one layer to be treated above a glass transition temperature $T_g$ of the at least one layer to be treated to thereby create a heated portion of the at least one layer to be treated, a portion of the web stock in proximity to the heated portion of the at least one layer to be treated thereby becoming a heated portion of the web stock;
    inducing curvature in the heated portion of the web stock; and cooling the heated portion of the web stock at said curvature while the web stock is in motion between the first location and the second location;
    wherein said cooling comprises directing a stream of super-sonic cooled air at the heated portion of the web stock.

2. The method of claim 1 wherein heating comprises providing at least one heat source.

3. The method of claim 2 wherein providing at least one heat source includes positioning an infrared lamp in proximity to the web stock.

4. The method of claim 3 wherein providing at least one heat source further comprises placing a reflector around the infrared lamp to focus energy emitted by the infrared lamp into a heating line on a surface of the web stock.

5. The method of claim 4 wherein the reflector is a hemi-ellipsoidal reflector.

6. The method of claim 2 wherein providing at least one heat source comprises providing a preheater.

7. The method of claim 6 wherein providing a preheater comprises passing the web stock over a heated surface.

8. The method of claim 7 wherein the heated surface is an arcuate portion of an outer surface of a cylinder.

9. The method of claim 8 wherein the cylinder is heated by an internal electrical resistance element.

10. The method of claim 8 wherein the cylinder is heated by fluid passing therethrough.

11. The method of claim 8 wherein the preheated web stock is transported to a processing treatment cylinder.

12. The method of claim 11 wherein inducing curvature includes moving the web stock over an arcuate portion of an outer surface the processing treatment cylinder.

13. The method of claim 1 wherein directing the stream of cooled air comprises passing air through a cooled liquid.

14. The method of claim 1 wherein directing the stream of cooled air includes directing carbon dioxide snow at the web stock.

15. The method of claim 1, wherein the layer being heated is a charge transport layer.

16. The method of claim 1, wherein the stream of cooled air is directed at the at least one layer to be treated.

17. The method of claim 13, wherein the stream of cooled air includes droplets of atomized liquid.

18. A stress/strain relief method for a flexible, multilayered web stock including:
    providing a multilayered web stock including at least one layer to be treated, the at least one layer to be treated having a coefficient of thermal expansion different from a coefficient of thermal expansion of another layer;

providing a processing tube having an arcuate outer surface;

moving the web stock toward the processing tube;

providing a heat source at the processing tube;

heating the web stock above a glass transition temperature $T_g$ of the at least one layer to be treated, and cooling the at least one layer after heating while the web stock is in motion, wherein cooling comprises employing a super-sonic air stream.

19. The method of claim 18 wherein the processing tube has an annular chamber within.

20. The method of claim 18 wherein the at least one layer to be treated includes a charge transport layer.

21. The method of claim 18 wherein providing the web stock includes providing a roll of web stock and the method further comprises unwinding the web stock from the roll with the at least one layer to be treated facing outwardly.

22. The method of claim 18 moving the web stock comprises ensuring that the web stock makes an entering contact with the processing roll at substantially 12 o'clock and substantially conforms to an arcuate surface of processing tube.

23. The method of claim 18 wherein providing a heat source includes positioning the source directly above the processing tube.

24. The method of claim 18 wherein heating the web stock comprises substantially instantly elevating a localized temperature of the at least one layer to be treated at the processing tube.

25. The method of claim 24 wherein elevating a localized temperature of the at least one layer to be treated includes heating the at least one layer to between about 5° C. and about 25° C. above a glass transition temperature $T_g$ of the at least one layer.

26. The method of claim 18 wherein providing a heat source includes providing an infrared lamp and providing a reflector.

27. The method of claim 26 wherein providing an infrared lamp comprises providing a lamp extending over an entire width of the web stock.

28. The method of claim 27 wherein providing an infrared lamp comprises providing a halogen quartz tube.

29. The method of claim 26 wherein providing a reflector comprises a providing a hemi-ellipsoidal reflector.

30. The method of claim 29 wherein providing an infrared lamp includes positioning the infrared lamp at a focal point of the reflector such that substantially all infrared radiant energy emitted from the lamp is reflected and converges at a second focal point of the reflector in a heating line of sufficient width to cover substantially an entire width of the web stock.

31. The method of claim 26 further comprising providing a heating line over the web stock surface to substantially instantaneously elevate web stock surface temperature.

32. The method of claim 18 wherein the cooling air stream is delivered by an air knife.

33. The method of claim 18 wherein cooling comprises lowering a temperature of the at least one layer by at least about 20° C. below the $T_g$ of the at least one layer.

34. The method of claim 18 wherein employing a cooling air stream comprises bubbling air through a liquid medium.

35. The method of claim 34, wherein the cooling air stream includes droplets of atomized liquid.

36. The method of claim 18, wherein the at least one layer to be treated is the charge transport layer.

37. The method of claim 21, wherein the roll of web stock is unwound at an approximately constant speed.

* * * * *